US006211906B1

(12) United States Patent
Sun

(10) Patent No.: US 6,211,906 B1
(45) Date of Patent: Apr. 3, 2001

(54) COMPUTERIZED COMPONENT VARIABLE INTERFERENCE FILTER IMAGING SPECTROMETER SYSTEM METHOD AND APPARATUS

(75) Inventor: Xiuhong Sun, North Andover, MA (US)

(73) Assignee: Flight Landata, Inc., Lawrence, MA (US)

( * ) Notice: Subject to any disclaimer, the term of this patent is extended or adjusted under 35 U.S.C. 154(b) by 0 days.

(21) Appl. No.: 09/165,873

(22) Filed: Oct. 2, 1998

Related U.S. Application Data

(63) Continuation-in-part of application No. 09/094,289, filed on Jun. 9, 1998, and a continuation-in-part of application No. 08/524,864, filed on Sep. 7, 1995, now Pat. No. 5,790,188.

(51) Int. Cl.[7] ..................................................... H04N 7/18
(52) U.S. Cl. ............................................. 348/144; 348/143
(58) Field of Search ............................... 348/31, 42, 135, 348/143–145, 147, 229, 296; 356/328, 301; 250/339.07

(56) References Cited

U.S. PATENT DOCUMENTS

| 4,045,795 | 8/1977 | Fletcher et al. ................... 343/5 CM |
| 4,134,683 | 1/1979 | Goetz et al. .......................... 356/407 |

(List continued on next page.)

OTHER PUBLICATIONS

"The Conception, Design and Airborne Test of a Variable Interference Filter Imaging Spectrometer System," Sun, Thesis Presented University of Dundee, United Kingdom, Feb. 8, 1993, pp. i–25. Scotland.

"Development of Real–Time Software for a Variable Interference Filter Imaging Spectrometer", Sun & Anderson, Dundee, UK, p. I–10. Sep. 15–17, 1992, Scotland.

"Pushbroom Queue Processing For Three–Dimensional Remote Sensing Using a Transputer Based Frame Grabber Module", Sun & Anderson, Dundee, UK, pp. 161–167. (Scotland). Aug. 1991.

International Airborne Remote Sensing Conference and Exhibition, Sun & Anderson, Strasbourg, France, vol. II, Sep. 12–15, 1994, pp. II–178–II–191. entitled "An Easily Deployable, Minature, Airborne Imaging Spectrometer".

(List continued on next page.)

*Primary Examiner*—Vu Le
(74) *Attorney, Agent, or Firm*—Pearson & Pearson, LLP; Walter F. Dawson

(57) ABSTRACT

A miniature, computerized component, variable interference imaging spectrometer ($C_2VIFIS$) system for airborne remote sensing data acquisition with a two dimensional field of view. An alternating staring/scanning method is used to optimize a pushbroom hyperspectral image data set with a photogrammetric reference. Synchronized CCD-imager sensor modules or cameras are aligned to a common field of view. One imager module has a visible range variable interference filter on its surface, a second imager module has a near-infrared range variable interference filter on its surface, and a third imager module has a bandbase filter attached to the imager. Video data from the three sensor modules is digitized and recorded in real time. Further, such video data is monitored by a computer and used to control the shutter exposure of each of the three sensor imager modules. Wavelength spectral image data and directional spectral image data are acquired by a single pass over a target area. Post-processing of such data produces reconstructed track-recovery-images extracted from a sequence of video frames for the spectral regions of interest at a fixed column position to produce multiple bands of monochrome images.

18 Claims, 11 Drawing Sheets

U.S. PATENT DOCUMENTS

| | | | |
|---|---|---|---|
| 5,043,571 | 8/1991 | Hasegawa | 250/226 |
| 5,149,959 | 9/1992 | Collins et al. | 250/226 |
| 5,173,748 | 12/1992 | Bilhorn | 356/328 |
| 5,276,321 | 1/1994 | Chang et al. | 250/266 |
| 5,354,980 | 10/1994 | Rappoport et al. | 250/208 |
| 5,371,358 | 12/1994 | Chang et al. | 250/226 |
| 5,384,589 * | 1/1995 | Ulich et al. | 348/31 |
| 5,450,125 * | 9/1995 | Ulich et al. | 348/31 |
| 5,589,880 * | 12/1996 | Tsukui | 348/229 |
| 5,790,188 * | 8/1998 | Sun | 348/144 |

OTHER PUBLICATIONS

"A Spectrally–Filtered Airborne Video System and Its Imagery", Sun, Baker and Hordon, Flight Landata, Inc., 15th Biennial Workshop on Color Photography and Videography in Resource Assessment, Indiana State University, Terre Haute, Indiana, pp. 1–9.

"Wedge Imaging Spectrometer (WIS): Hyperspectral Data Exploitation", L.M. Woody, Presented at the First International Airborne Remote Sensing Conference and Exhibition, Strasbourg, France, Sep. 11–15, 1994, pp. II–630–II–641.

"New Sensor Technology for Acquiring Hyperspectral Imagery", J.G. Thunen, L.M. Woody, Presented at the first International Airborne Remote Sensing Conference and Exhibition, Strasbourg, France, Sep. 11–15, 1994, pp. II–322 to II–331.

"Needs and Solutions for Pollution Monitoring Control, and Abasement", Vol. 1, Proceedings of the First Thematic Conference, Remote Sensing for Marine and Coastal Environments, New Orleans, Louisiana, USA, SPIE Vol. 1930, Jun. 15–17, 1992, pp. 1063–1076.

"Remote Sensing for Marine and Coastal Environments, Needs, Solutions and Applications", vol. II, Proceedings of the Second Thematic Conference, Jan. 31–Feb. 2, 1994, New Orleans, LA. pp. xxi–II–506 to II–517.

"Computerized Airborne Multicamera Imaging System", Presented at the Second International Airborne Remote Sensing Conference and Exhibition, San Francisco, California, Jun. 24–27, 1997, pp. III–803 to III–812.

"Computerized Airborne Multicamera Imaging System (CAMIS) and Its Four–Camera Applications", Present at the Third International Airborne Remote Sensing Conference and Exhibition, Cophehagen, Denmark, Jul. 7–10, 1997, pp. II–799 to III–805.

* cited by examiner

COMPUTERIZED COMPONENT VARIABLE INTERFERENCE FILTER IMAGING SPECTROMETER SYSTEM METHOD AND APPARATUS

CROSS REFERENCE TO RELATED APPLICATION

This is a continuation-in-part of copending application Ser. No. 09/094,289, filed Jun. 9, 1998, now pending, and Ser. No. 08/524,864, filed Sep. 7, 1995, now U.S. Pat. No. 5,790,188, issued Aug. 4, 1998, both assigned to the same assignee as the parent application.

BACKGROUND OF THE INVENTION

This invention relates to an imaging spectrometer system and more particularly, to a hyperspectral imaging system operating in an alternating staring/scanning mode for acquiring ground track images from air or space platforms acquiring an optimized pushbroom hyperspectral image data set with photogrammetric reference.

Over the past decade, imaging spectrometry has been emerging as a new remote sensing tool following advances in multispectral imaging technology. Imaging spectrometry, which consists of the acquisition of images in many narrow, contiguous spectral bands, offers considerable advantages over traditional multispectral scanner imaging for remote sensing in terms of high resolution in spatial, spectral, and radiometric domains. Consider the spectral domain for example. The reflected solar radiance, which carries the spectral characteristics of the remotely sensed targets on the earth surface, used to be undersampled (with only a few discrete measurement bands) by multispectral scanners. For instance, a Coastal Zone Colour Scanner (CZCS) in the NIMBUS-7 satellite (1978–1986) has four visible bands at 433, 520, 550 and 670 nm with 20 nm half-width and a Thematic Mapper™ of Landsat supplies only six broad spectral bands of images with large gaps over the solar reflected spectral range 0.4 to 2.5 mm. Imaging spectrometers are designed to provide contiguous spectral sampling over the measurement range.

Imaging spectrometry results in hyperspectral image data set (Geotz et al. 1985). By contiguous high-resolution spectral-imaging sampling, the data yielded from the imaging spectrometry approach will increase by over an order of magnitude over the current multispectral scanner data in the same spectral region.

In the prior art an airborne multiband imaging spectrometer is described in U.S. Pat. No. 5,149,959, issued Sep. 22, 1992 to William E. Collins, et al. and assigned to Geophysical & Environmental Research Corporation of New York. The Collins et al. spectrometer is basically a whiskbroom imaging spectrometer. In the most basic whiskbroom approach, a rotating mirror scans the ground crosswise to the path of the airplane. The crosswise data is picked up pixel by pixel. The image is skewed, compared to a photographic image because the crosstrack pixels are not in a line; the later-recorded pixels are further along the ground than the earlier-recorded pixels. However, Collins et al. improve on the basic whiskbroom approach by using a rotating polygon mirror to scan the ground four times per revolution, allowing a factor of four reduction of rotation speed to scan speed. The spectrometer comprises a beam splitter that divides the light into two (or more) beams or so called contiguous bands. Then two (or more) beams are directed to two (or more) diffraction gratings and then to detectors. Each of the detectors is comprised as a line array for each diffraction grating. The detector output is sent to a signal processor, which is chiefly a normal analogue to a digital (A/D) converter. The output data is converted for recording and real time display. However, whiskbroom imaging spectrometers are big and heavy, perhaps 200 kilograms for a typical unit, and mechanically complex. Also, the images are not the same as photographs and there may be skewing.

In U.S. Pat. No. 5,276,321, issued Jan. 4, 1994 to Sheng-Huel Chang et al. and assigned to Geophysical & Environmental Research Corporation, a multi-channel imaging spectrometer for airborne geological surveys and environmental surveys in a moving vehicle similar to U.S. Pat. No. 5,149,959 is described. It comprises an optical scanner employing a rotating polygon scan mirror which achieves a wide lateral field of view in what is known as whiskbroom mode of operation. The energy scanned is directed by a Kennedy scanner to a parabolic mirror and then fed to a plurality of spectrometers. A further improvement provides another mode of operation, known as the "pushbroom" or "staring" mode which utilizes a fixed mirror centered on the nadir and utilizes the motions of the vehicle to scan the scene. In a further improvement, the scene is scanned by the rotating mirror and the image is sequentially applied to a two-dimensional array so as to generate a continuous three-dimensional spectral display. However, this invention employs a complicated rotation polygon as a simple mirror in the pushbroom imaging mode.

A dispersion component-based imaging spectrometer has a one dimensional view. Its dispersed two-dimensional imagery gives no information about a geometric view of the ground track. A band switching video (using a filter wheel or a tuneable filter) imagery sequence is never visually comfortable to a user because of periodic flickering caused by the periodic band changing. In the traditional one-dimensional field of view imaging spectrometers, as described above in U.S. Pat. No. 5,276,021, they are not able to provide directional spectral images.

A wedge image spectrometer (WIS) for collecting imagery is described in a paper by J. G. Thunew and L. M. Woody entitled, "New Sensor Technology for Acquiring Hyperspectral Imagery," First International Airborne Remote Sensing Conference and Exhibition, Strasbourg, France, 11–15, Sep. 1994. The WIS comprises a linear spectral wedge filter with tapered layers. It is a thin-film optical filter that transmits light at a center wavelength that depends on the spatial position of the illumination. If an array of detectors is placed behind the device, each detector now will receive light from the scene at a different center frequency and the array output is the sampled spectrum of the scene. By mating the wedge filter to an area array, the scene information was claimed to vary spatially in one direction and spectrally in the other (Thunew and Woody, 1994). Moving the assembly perpendicular to the spatial dimension builds a two-dimensional spatial image in each of the spectral bands. Another version of the WIS is implemented with a mosaicized filter which comprises two filters with each filter covering less than a spectral octave. However, the actual two dimensional field of view nature of this sort of imaging spectrometer using one area sensor, has associated with it the difficulty of separating the angular effects introduced by the two-dimensional field of view observation. It cannot separate and measure the directional effect. Moreover, it could be hard to focus both the blue light such as at 400 nm, and the near infrared light such as at 1050 nm onto a single focal plane of sensor.

An imaging spectrometer, comprising imaging optics, a spectrometer module and a sensor, is a physical instrument for realizing the imaging spectrometry concept. It can be categorized by the type of the spectrometer adopted. Traditionally a light dispersion spectrometer is employed in an imaging spectrometer design using a grating or prism as the dispersing element. Later, the light-frequency-spatially-selecting spectroscopy concept was developed by the present inventor at University of Dundee, of Dundee Scotland, to construct a spatially linear variable interference filter based imaging spectroscopy instrument (VIFIS) as described in a paper by X. Sun and J. M. Anderson, "A Light-Frequency-Spatially-Selecting Component Based Airborne Pushbroom Imaging Spectrometer for the Water Environment", Proceedings of the First Thematic Conference on Remote Sensing for Marine and Coastal Environments, SPIE Volume 1930, New Orleans, La. p. 1063–1076, 1992. It is simple and compact in structure with advantages in easy deployment, two-dimensional field of view, the same ray geometry to a normal video camera, better picture quality, and application flexibility. However, analog video recording techniques were employed resulting in less than desirable picture quality.

The first two dispersion imaging spectrometers were tested in the early 1980s. They are the airborne imaging spectrometer (AIS) by Jet Propulsion Laboratory (JPL) (Vane, et al. by Moniteq Ltd. of Toronto (Gower et al. 1985). The first airborne single camera variable filter imaging spectrometer was tested in 1991 (see above, Sun and Anderson 1992).

However, the spectral track-recovery-images of VIFIS are three-parameter spectral images dispersed along the correlated wavelength, direction and time-delay parameters. Its pixel spectrum is progressively scanned rather than simultaneously captured and may be subject to the influence of different viewing angles.

In U.S. Pat. No. 5,790,188 issued to Xiuhong Sun on Aug. 4, 1998 and assigned to Flight Landata, Inc. of Lawrence, Massachusetts, a variable interference filter imaging spectrometer (VIFIS) system is described which acquires ground track images from air or space with a two-dimensional field of view and generates imagery from three channels of synchronized video outputs. The synchronized output video from each camera is fed to a control and interface unit where a composite analog signal is formed from the individual output video signals for recording on an analog video recorder. A digital signal is also generated for recording on a computer disk. Control of the shutter speed of each of 3 cameras is provided.

The present invention is a further improvement of the VIFIS system using three camera modules, but having all digital processing and employing a staring/scanning method.

SUMMARY OF THE INVENTION

Accordingly, it is therefore an object of this invention to provide a miniature, hyperspectral, imaging spectrometer system for airborne remote sensing data acquisition.

It is an object of this invention to provide a digital hyperspectral imaging system employing a staring/scanning method for acquiring an optimized pushbroom hyperspectral image data set with a photogrammetric reference.

It is another object of this invention to provide a modified CCD video imager having a detector array that is spectrally filtered by an attached linear variable interference filter.

It is another object of this invention to provide an imaging spectrometer system for acquiring both wavelength spectral image data and directional spectral image data.

It is a further object of this invention to provide a spectrally filtered imaging system having three synchronized CCD-imager modules or cameras aligned to a common field of view for acquiring wavelength spectral image data and directional spectral image data with a single pass over a target area, each of the cameras having its shutter exposure under program control.

It is a further object of this invention to obtain the spectrally filtered video data from three synchronized CCD-imager modules or cameras wherein a first one of the cameras comprises a visible-range variable interference filter, a second one of the cameras comprises a near-infrared range variable interference filter and a third one of the cameras has a bandpass.

It is a further object of this invention to provide a miniature imaging spectrometer system having a photogrammetric reference for all the scanning lines, a staring image or a mosaic of staring images which is used to correct the pushbroom-scanning related geometric distortions.

These and other objects are further accomplished by an imaging spectrometer system comprising a first imager means having a variable interference filter for acquiring spectral images over a first predetermined range, a second imager means having a variable interference filter for acquiring spectral images over a second predetermined range, a third imager means for acquiring photogrammetric reference and directional spectral images, means for synchronizing the first imager means, the second imager means and the third imager means to acquire the images simultaneously, means coupled to outputs of the first imager means, the second imager means and the third imager means for converting the outputs from analog to digital signals, and means coupled to the outputs of the analog to digital converting means for processing the digital signals of the images, the processing means comprises means for performing an alternating staring and scanning method of operation. The system comprises means coupled to the first imager means, the second imager means and the third imager means for controlling a shutter exposure time for acquiring the images. The processing means comprises memory means for temporary recording staring image data and scanning image data. The means for temporary recording the staring image data and the scanning image data comprises a synchronized dynamic random access memory (SDRAM). The system comprises disk means coupled to the temporary recording means for recording the staring image data and the scanning image data received from the processing means. The system comprises bus means for coupling the disk means to the temporary recording means. The third image means comprises means for obtaining a set of the staring and scanning operation image data filtered with the same wavelength. The means for performing the alternating staring and scanning operation comprises means for acquiring an optimized pushbroom hyperspectral image data set with a photogrammetric reference. Each of the first imager means, the second imager means and the third imager means comprises a progressive-scan CCD camera. The first imager means, the second imager means and the third imager means are aligned to a common field of view.

The objects are further accomplished by a method of providing an imaging spectrometer system comprising the steps of acquiring spectral images over a first predetermined range with a first imager means having a variable interference filter, acquiring spectral images over a second predetermined range with a second imager means having a variable interference filter, acquiring directional spectral images with a third imager means, synchronizing the first imager means, the second imager means and the third imager means to acquire the images simultaneously, converting outputs of the first imager means, the second imager means and the third imager means from analog to digital signals, and performing an alternating staring and scanning operation on the acquired images digital outputs from the analog to digital converting means in a processing means. The method comprises the step of controlling a shutter exposure time of the first imager means, the second imager means and the third imager means for acquiring the images. The step of performing an alternating staring and scanning operation comprises the step of temporary recording staring image data while acquiring scanning image data. The step of performing an alternating staring and scanning operation on the acquired images comprising the steps of (a) recording a staring image in a temporary buffer, (b) recording a plurality of scanning image data, (c) performing a comb-styled extraction on the scanning image data, (d) recording the extracted scanning image data, (e) repeating steps a–d a predetermined number of times, and (f) transferring the staring image data from the temporary buffer to a permanent recording means. The step of synchronizing the first imager, the second imager and the third imager to acquire the imager simultaneously further comprises the step of aligning the imagers to a common field of view. The step of performing an alternating staring and scanning operation on the acquired images produces an optimized pushbroom hyperspectral image data set with a photogrammetric reference. The step of recording a plurality of scanning image data comprises several hundreds of the scanning lines. The method comprises the step of displaying image data from the first imager means the second imager means and the third imager means on a monitor.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
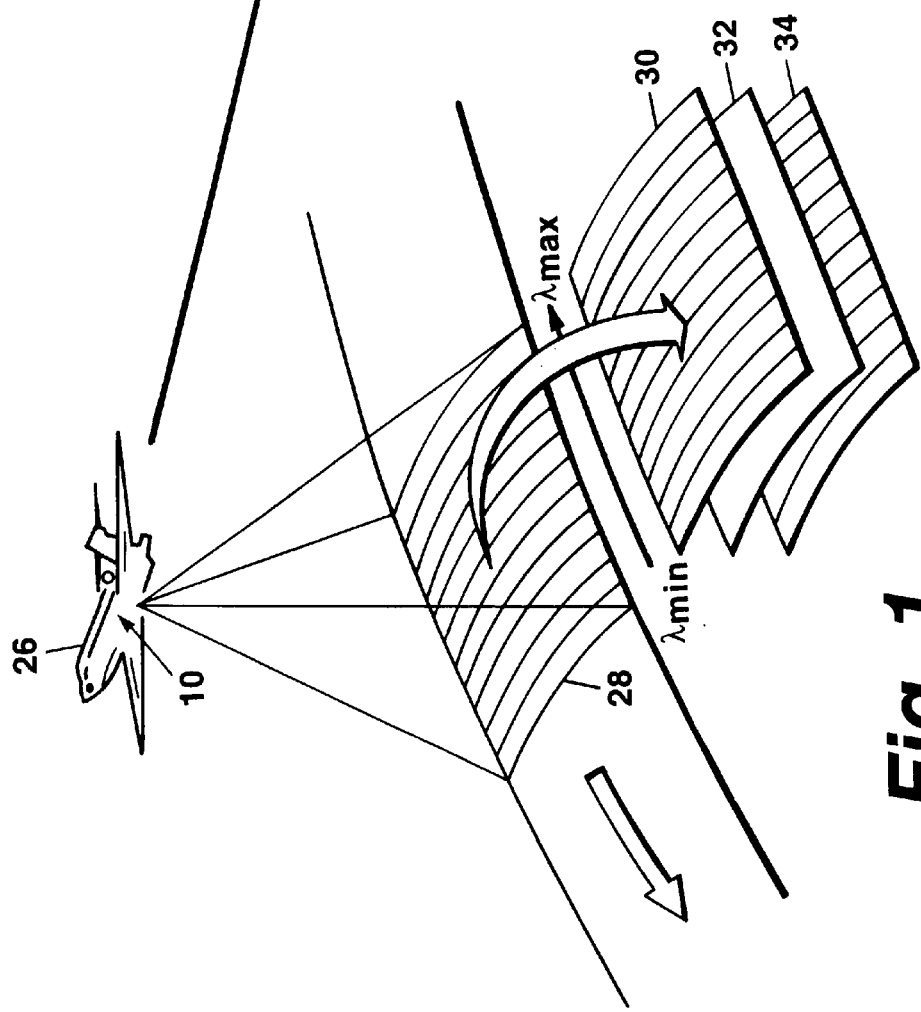
FIG. 1 is a pictorial representation of a two-dimensional field of view from an aircraft carrying a variable interference filter imaging spectrometer system showing three image planes obtained by three synchronized CCD cameras.

Referring to FIG. 1, a pictorial representation of an aircraft 26 employing the invention is shown. The invention of a computerized component variable interference filter imaging spectrometer ($C_2$VIFIS) system 10 acquires ground track images 28 from air or space with a two-dimensional field of view and generates imagery from three channels of synchronized video sources. The ground track 28 is images into a spectral filtering image plane 30 in the visible range, a panchromatic plane 32, and a near infrared spectral filtering plane using three CCD sensors aligned to each other and to a common field of view.

Figure 2:
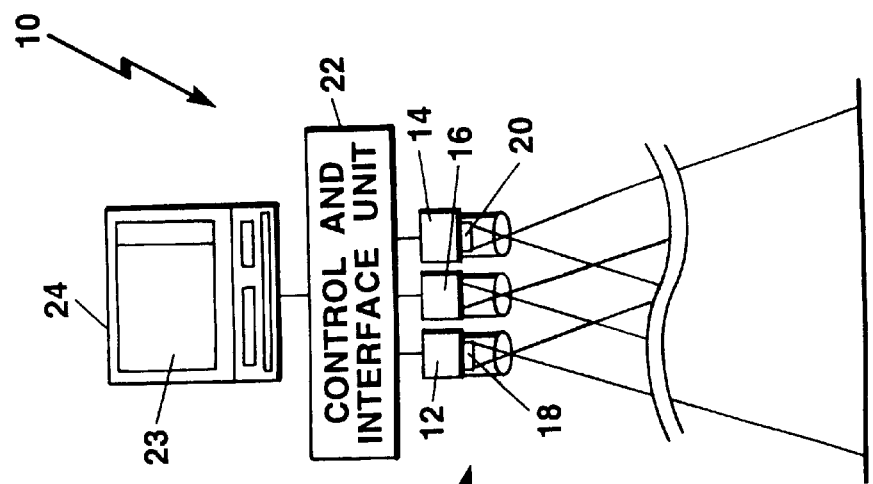
FIG. 2 is a block diagram of the variable interference filter imaging spectrometer (VIFIS) system employed in FIG. 1.
Figure 4:
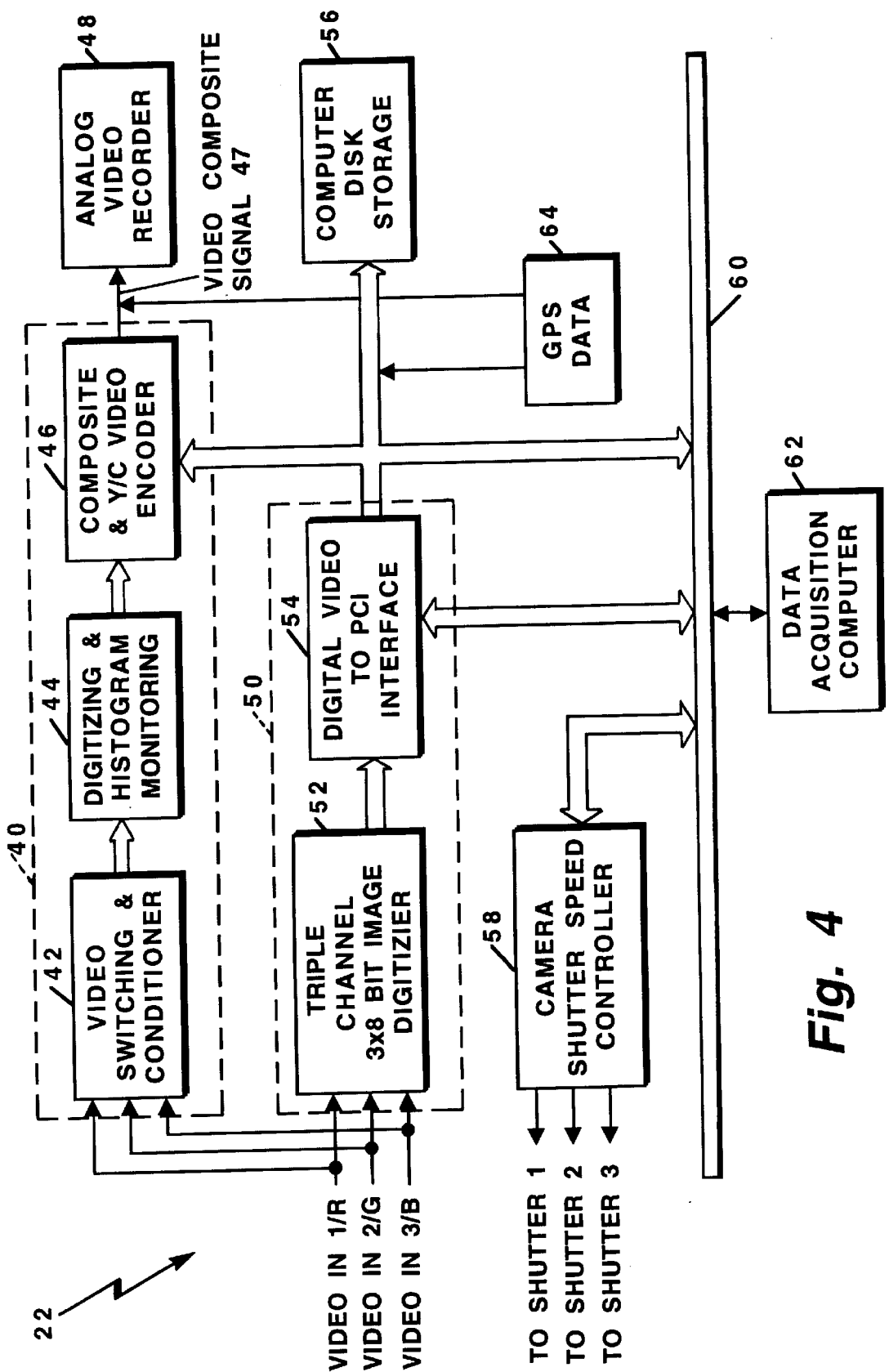
FIG. 4 is a detailed block diagram of the invention comprising a digital hyperspectral imaging system.

Referring to FIG. 2, a simplified block diagram of the computerized component variable interference filter imaging spectrometer ($C_2$VIFIS) system 10 is shown comprising the three synchronized CCD-imager modules or cameras 12, 14, 16, aligned to each other and to a common field of view. The synchronized video stream from each camera is fed to a control and interface unit 22. The control and interface unit 22 performs a staring/scanning operation for recording the digital images on a disk. The control and interface unit 22 also controls the shutter speed of each of the cameras 12, 14, 16. The video signals from the control and interface unit 22 are fed to a digital hard disk 198 and monitor 24 for monitoring and processing as shown in FIG. 4. One of the cameras 12 comprises a near-infrared range variable interference filter 18 fitted to the sensor surface of the camera and covers the range of 620 nm ($\lambda_{MIN}$) to 870 nm ($\lambda_{MAX}$). Camera 16 comprises a visible-range variable interference filter fitted to the sensor surface of the camera and covers the range of 420 nm ($\lambda_{MIN}$) to 620 nm ($\lambda_{MAX}$). The third camera 14 is a normal panchromatic CCD video camera which can be attached with a normal bandpass filter if required. This arrangement of the three cameras 12, 14, 16 as shown in FIG. 2 permits the acquiring of both wavelength spectral image data and directional spectral image data by a single pass of the cameras over a target area for measuring both wavelength and directional effects. Other advantages result such as video spectral coverage, flatter spectral response and more accurate focus, from the use of the two separate filters.

Figure 3:
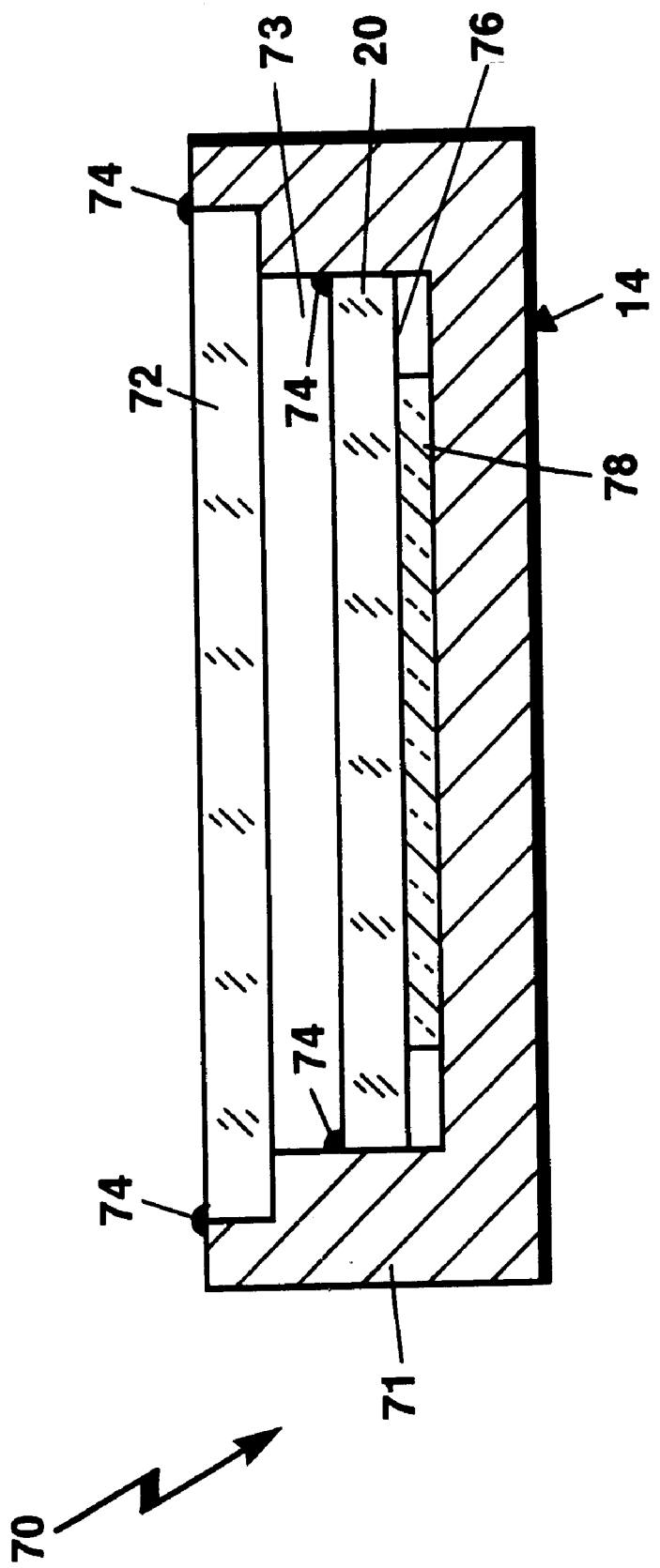
FIG. 3 shows a cross-section of a CCD imager assembly and the positioning of a variable interference filter.

Referring now to FIG. 3, a cross-section is shown of camera 14 assembly comprising the variable interference filter 20 attached to a silicon CCD sensor 78 of the CCD imager or camera 14. The outer surface of the camera assembly 14 comprises a blocking filter glass window 72. This window 72 is removed for insertion of the variable interference filter 20. A silicon CCD sensor 78 is positioned adjacent to the inside surface of a mounting base 71 of the camera assembly 14. Above the silicon CCD sensor 78 is positioned the glass substrate of the variable interference filter 20 having a coated surface 76 facing the sensor 78. Such filter 20 is cut to size to fit over the silicon CCD sensor 78. There is an air space 73 between the variable interference filter 20 and the blocking filter glass window 72. A spectrum light source which makes spectral lines visible on the filter 20 is used to align the spectral lines of the variable interference filter 20 right on the silicon CCD sensor 78. When such aligning is completed, an ultraviolet (UV) curing optical adhesive 74 is used to cement the variable interference filter 20 at the inner sides of the mounting base 71. After the VIF 20 has been positioned, aligned, and cemented in the camera assembly 14, the blocking filter glass window 72 is positioned and cemented to the inner sides of the camera assembly 14 using the UV curing optical adhesive 74. The variable interference filters 18, 20 may be embodied by Model LVF 400–700 and LVF 600–1100 manufactured by Optical Coating Laboratory, Inc. of Santa Rosa, Calif. The optical adhesive 74 may be embodied by Tyne NOA-61 manufactured by Norland Products, Inc. of North Brunswick, N.J.

Referring now to FIG. 4, a detailed block diagram is shown of the computerized component variable interference filter imaging spectrometer ($C_2$VIFIS) system 150 for airborne remote sensing applications. Two kinds of spectral imaging systems, the multispectral and hyperspectral systems, have been emerging and evolving for remote sensing. A multispectral imaging system collects images in a number of spectral bands that, depending on the sensor of the system, may be chosen from some portions of the spectrum from ultraviolet to thermal-infrared. A hyperspectral imaging system acquires images of the same scene in many narrow, contiguous spectral bands over a given spectral range. By adding wavelength as a third dimension to the image plane, the contiguous spectrum of any pixel in the hyperspectral scene can be accessed.

System 150 operates as a hyperspectral system. It performs an alternating staring/scanning method to collect 96 bands of pushbroom images within 420–870 nm range at about 10 nm spectral resolution with a swath width of 576 pixels. This newly developed alternating staring/scanning method enables the spatial/spectral co-registration of a data cube using a well known pattern-matching algorithm employing maximum correlation.

Referring again to FIG. 4 the $C_2$VIFIS system 150 comprises a sensor head 151 including three imagers 152, 153, 154, an imager interface 156, a display interface 166, a processor 174, an LCD monitor 172 and a data acquisition computer system including interfaces to peripheral devices. The display interface 166 communicates with the processor 174 and a peripheral component interconnect (PCI) to PCI bridge 182 via a bus 175. The PCI to PCI bridge 182 connects to a host PCI and industry standard architecture (ISA) bus 186 which interconnects the data acquisition computer system including a data acquisition computer 184, a global positioning system 190, a fast ethernet card 194 for connecting to the ground based computer 63, an ultra-wide small computer system interface (SCSI) 195 for interfacing with external SCSI devices 195, and a hard disk 198.

The three imagers 152, 153, 154 comprise two kinds of modularized imagers, S-imagers 152, 153 and a B-imager 154. The imagers 152, 153, 154 are embodied with whole-frame-progressive-scan CCD cameras, such as Model XC8500CE manufactured by Sony Corporation. These cameras have a frame size of 768 (columns)×576 (rows) each. The B-imager 154 comprises a bandpass filter (not shown) attached on its front optics. The S-imagers 152, 153 are modified to have spectral-pass filters 18, 20 as shown in FIG. 2 directly on the surface of sensor 78 such as is shown in FIG. 3. Such filters 18, 20 are linear variable interference filters as previously described. The B-imager 154 and S-imagers 152,153 are electronically and photogrammetrically compatible. They can be electronically and optically fused together to share common video timing and a common field of view.

The transmitted wavelength of the linear variable interference filter varies linearly along one of the orthogonal directions of its rectangular filter plane. Within the S-imagers 152, 153 a linear variable interference filter 20 is so fitted that the transmitted wavelength increases along the column incremental direction of the charge coupled device (CCD). The currently available S-imagers have continuous spectral coverage at 420–620 nm, 620–870 nm, and 650–900 nm ranges respectively. The physical bandwidth (half-peak, full-width) of a linear spectral sensor component (or a column) within an S-imager is typically 2% of center pass wavelength. For example, it has a 10 nm bandwidth for the 500 nm spectral sensor component. The pre-configurable bandpass filters for the B-imager 154 are widely selectable within 400–1100 nm range.

The $C_2$VIFIS system 150 sensor head 151 is configured in a 2S-B hybrid mode. It comprises the two S-imagers 152, 153, covering the continuous spectral ranges of 420–620 nm and 620–870 nm respectively, and the B-imager 154, attached with or without a bandpass filter. These three imager modules are aligned in parallel to point to a common field of view from a vantagepoint. The computer color composite of the three-layered framing imagery of a 2S-B hybrid sensor head looks like an artful color photograph filtered by a rainbow-color filter.

The three imagers 152, 153, 154 of sensor head 151 are arranged the same positions as the cameras 12, 14, 16 shown in FIG. 2. S-imager 152 is in the position of camera 12, S-imager 153 is in the position of camera 14 and B-imager 154 is in the position of camera 16.

Figure 9:
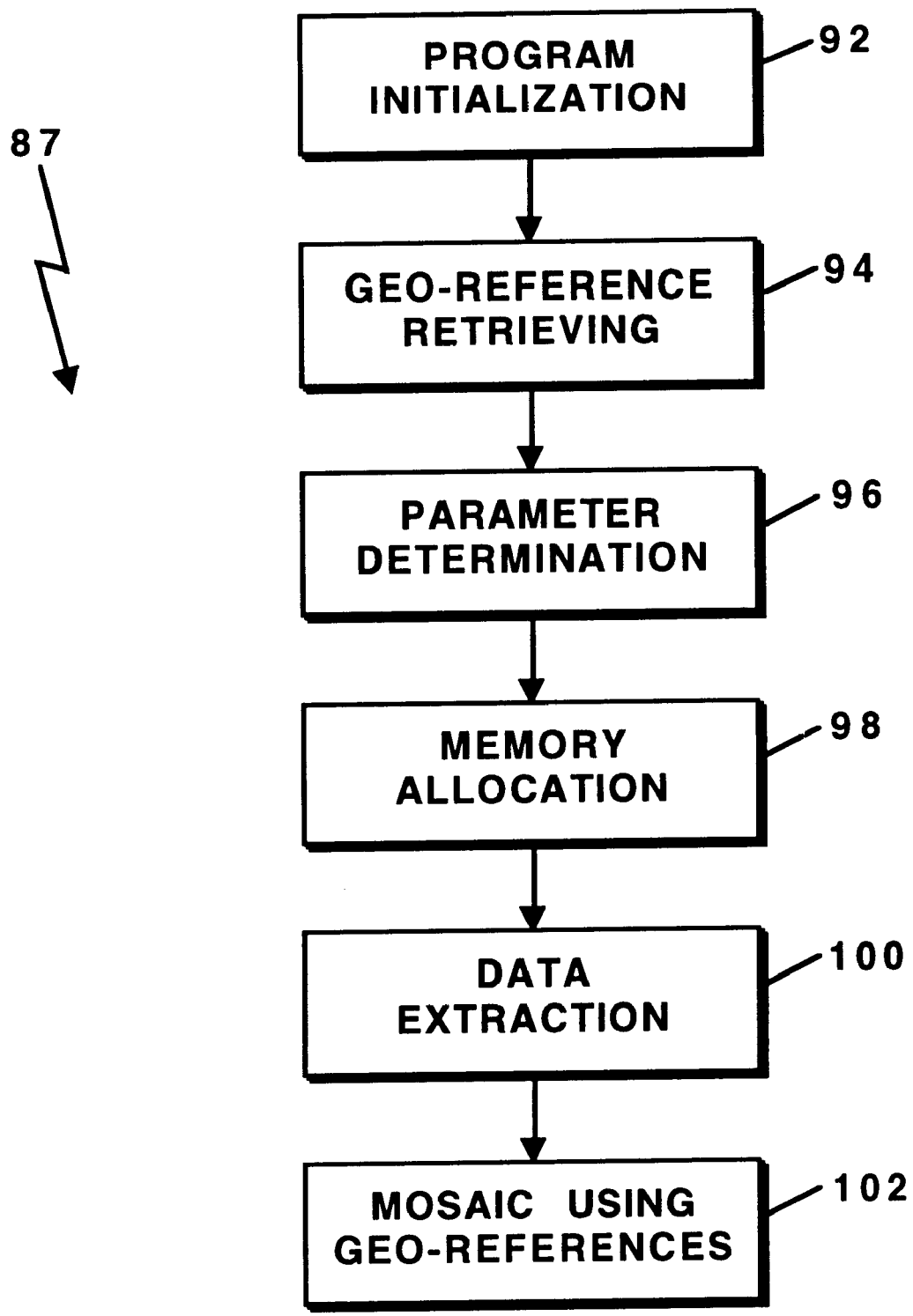
FIG. 9 is a timing diagram of the shutter control timing signals VD, HD and TRIG which generate exposure time.

Still referring to FIG. 4, the imager interface 156 provides analog to digital (A/D) converters 157, 158, 159 for converting the imager output signals to 8-bit digital words. A/D converter 160 is not used. The imager interface 156 also provides the circuits for implementing the shutter exposure controller 163 which receives a GPS 1 PPS sync signal 192 from the global positioning system 190 and generates the shutter exposure control signals 161 as shown in FIG. 9. The 8-bit output of the A/D converters 157, 158, 159 form a 24-bit packet data which is sent to the display interface 166 and the processor 174 which includes an SDRAM 180 temporary buffer 180. The processor 174 performs a staring/scanning operation on the digital image data received from the imager interface 156 and transfers the processed image data via the PCI to PCI bridge 182 to the hard disk 198.

Referring now to FIGS. 4–7, the system 150 collects hyperspectral images using a pushbroom scanning principle. In the art of remote sensing, it is well known that two-dimensional images can be obtained by using a one-dimensional sensor array in a pushbroom-scanning mode. Extending this concept, three-dimensional hyperspectral data cube, two-dimensional spatial and one-dimensional spectral, can be acquired by a two-dimensional spectral image sensor like an S-imager when performing pushbroom scanning.

Figure 5:
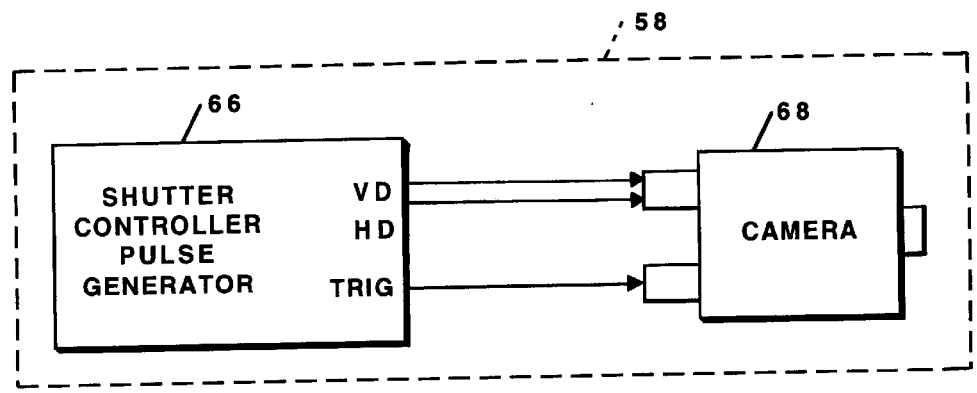
FIG. 5 is a flow chart of a staring/scanning method that is implemented in a data acquisition software program for acquiring an optimized pushbroom hyperspectral image data set with photogrammetric reference.

Referring to FIG. 5, a flow chart of an alternating staring/scanning method is shown that is implemented in a data acquisition software program for acquiring an optimized pushbroom hyperspectral image data set with photogrammetric reference. This method alternately performs a staring operation after performing several-hundreds of scanning operations. The staring component is designed to take snapshots of an original, full-frame-sized image. The scanning component is designed to sample the elementary images from 144 comb-style-distributed linear sensors line after line at a scanning rate of 25 scans/sec. Staring images are used to re-image the scene, which have been or will be scanned line after line. As a photogrammetric reference for all the scanning lines, the staring image can be used to rectify the pushbroom-scanning-related geometric distortions, and hence achieve the band-to-band co-registration for the complete hyperspectral data set, even if the sensor platform is not stabilized. This is possible since every scanned spectral image line can be geo-registered by referring a staring image according to the calculated maximum correlation.

The B-imager 154 provides a special set of staring/scanning image data that is filtered with the same wavelength. This brings additional benefits. First, the staring and scanning image data filtered with the same wavelength have the best correlation, which results in best pattern-matching for geo-registering every scan-line. Second, by adding the synchronized illumination monitoring, it enables the bi-directional effect measurement. Third, the staring/scanning image data can be used to correct possible spectral measurement errors related to scan timing and directional pointing. These topics have been discussed in the following publications: (1) X. Sun, THE CONCEPTION, DESIGN AND AIRBORNE TEST OF A VARIABLE INTERFERENCE FILTER IMAGING SPECTROMETER SYSTEM, Ph.D Thesis, Department of Applied Physics and Electronic and Manufacturing Engineering, University of Dundee, Dundee, U.K. pp. 1–255, Mar. 1, 1993; (2) X. Sun and J. M. Anderson, AN EASILY-DEPLOYABLE, MINIATURE, AIRBORNE IMAGING SPECTROMETER, Proceedings of the First International Airborne Remote Sensing Conference and Exhibition, Strasbourg, France, Vol. II, pp. 178–189, Sep. 11–15, 1994; (3) X. Sun and J. M. Anderson, EVALUATION OF THE APPLICATION POTENTIAL OF A VARIABLE INTERFERENCE FILTER IMAGING SPECTROMETER FOR THE WATER ENVIRONMENT, Marine Technology Society Journal, Vol. 28, No. 2, pp. 37–45, Summer 1994; and (4) X. Sun, J. Baker and R. Hordon, COMPUTERIZED AIRBORNE MULTICAMERA IMAGING SYSTEM, Proceedings of the Second International Airborne Remote Sensing Conference and Exhibition, San Francisco, USA, Vol. III, pp. 803–812, June 1996. In addition, using the whole-frame-progressive-scan imagers 151, 152, 153, a swath width of 576 effective pixel is achieved for an airborne remote sensing application, which doubles the effective pixels of an interlace-scanning camera or imager.

Figure 6:
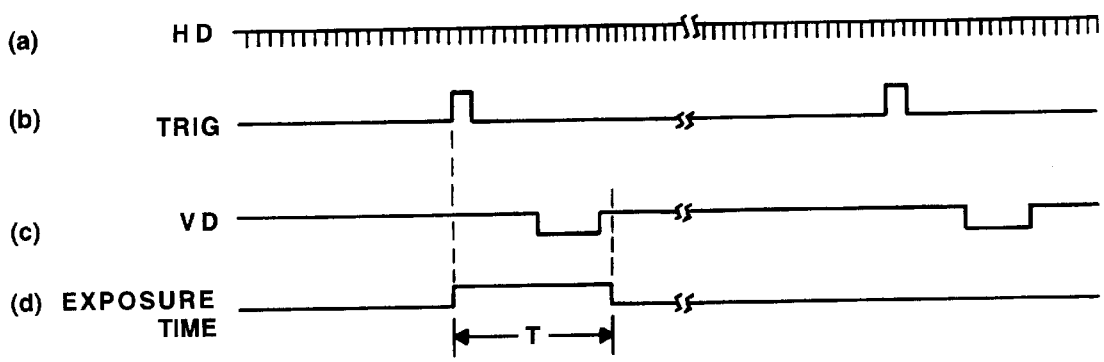
FIG. 6 is a diagram illustrating the recording of each staring image in a temporary SDRAM buffer as a shortcut during the staring/scanning method of FIG. 5.

Referring again to FIG. 5 and also FIG. 6, which shows a diagram illustrating the recording of each staring image in a SDRAM 180 temporary buffer, the staring/scanning recording of image data can be started automatically by the system (step 202) or by an instrument operator (step 208). When started automatically, the system loads mission plan 202 first, which has the longitude and latitude information of the target area for seeking the region of interest (ROI), step 204. Then the computer seeks the ROI using the real-time GPS measurements. If the ROI is reached, recording of image data starts. If the ROI is not reached, then the program continues in the loop seeking the ROI. An instrument operator can also fire the start recording command, which also ends the seeking ROI loop, step 204, 206.

When the staring/scanning recording begins in step 210, it records a staring image in a temporary buffer 180 as illustrated in FIG. 6, and then records several hundreds of scanning lines in step 212 which are sent to hard disk 198. If it has not reached the total number scanning lines, it will do staring/scanning again in a loop (step 210, 212). When the total number of scanning lines are reached, a final staring image is recorded in step 216.

Figure 7:
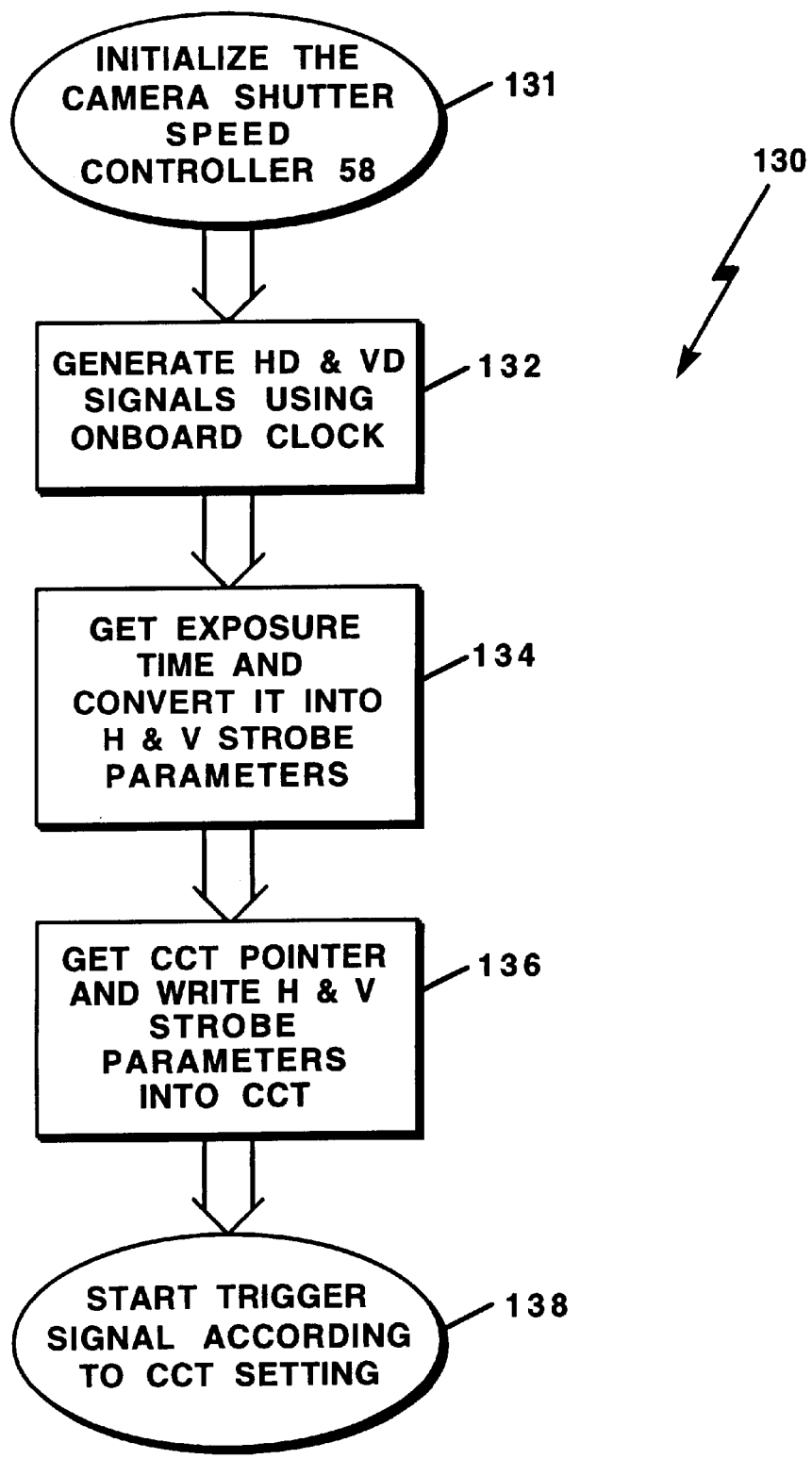
FIG. 7 is a block diagram showing a comb-style extraction of frame data producing a set of 48 spectral scan-lines of data recorded in a temporary buffer first and then writing on a hard disk immediately during the staring/scanning method of FIG. 5.

Referring to FIGS. 4, 6 and FIG. 7, FIG. 7 is a block diagram illustrating a comb-style extraction of frame data producing a set of 48 spectral scan-lines of data recorded in a temporary buffer first, and then writing the data on a hard disk immediately during the staring/scanning operation. As previously described, the two imager components 152, 153 of the 2S-B hybrid sensor head 151 use linear variable interference filters 18, 20 for spectral imaging. Each of these imagers 152, 153 has 768 linear spectral sensor components distributed along its column incremental direction, covering the continuous spectral ranges of 420–620 nm and 620–870 nm respectively with a transmitted wavelength increment of less than 0.33 nm between two adjacent bands (columns). However, considering that the physical bandwidth of a linear spectral sensor component is about 10 nm wide, there is no significant color separation between two adjacent bands. To avoid data redundancy, a comb-styled sampling method illustrated in FIG. 7 is used, which records the spectral image data from the 48 of three-layered sensor columns selected from a 768 nm column sensor frame 232 by a comb-styled band extraction (step 234). This process results in 144 selected linear sensors columns scanning forward, line after line. The scanning rate is 25 frames/sec. The image data is permanently stored on the hard disk 198.

The comb-styled sampling method is an efficient method to record all the desirable bands without data redundancy. However, it uses the pushbroom scanning concept recording images line after line in a time sequence. Instead of shooting a frame of image instantly, the pushbroom scanning method also introduces the variable camera pointing effect resulting from the aircraft pitch, row, and yaw into the data set during flying. This may cause all bands of pushbroom images to be geometrically distorted. To rectify these distortions, a staring, or a snapshot of the original framing styled sensor imagery of the 2S-B sensor head 151 is needed as the geometry reference of the scanning data.

Figure 8:
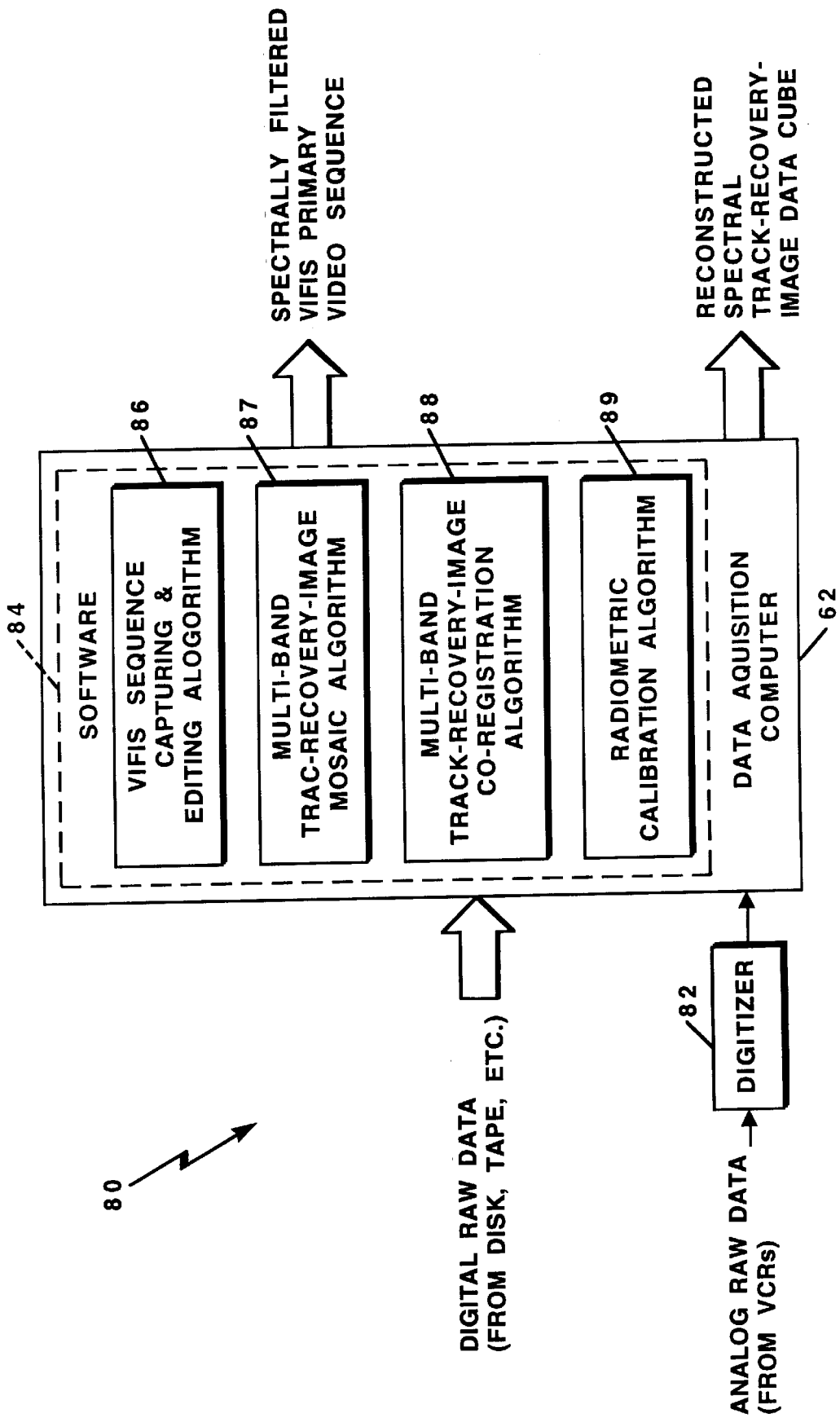
FIG. 8 is a block diagram showing a pulse generator generating shutter control timing signals.

Referring now to FIGS. 2, 4, 8, 9, and 10, the $C_2$VIFIS cameras 12, 14, 16 in FIG. 2 or imagers 152, 153, 154 in FIG. 11 can be operated under S-DONPISHA shutter control mode in conjunction with the camera shutter exposure controller 163 and appropriate software (described hereinafter). FIG. 8 shows a pulse generator 66 for generating HD, VD and TRIG pulses required for shutter control. FIG. 9 is a timing diagram showing the relative timing of the HD, VD and TRIG pulses. The shutter exposure time (T) is determined by the phase shift between the shutter trigger pulse (TRIG) and the VD pulse. The leading edge of the trigger pulse is usually in front of the trailing edge of the VD pulse plus a fixed delay. The HD and VD pulses are external synchronization signals supplied by the digital interface 162 and under a non-interlaced video scanning standards. The TRIG pulse has the same frequency as the VD pulse but a programmable phase difference. The frequency (period) parameters of the three pulses for imagers 152, 153, 154, SONY XC8500CE, are listed in the following Table:

TABLE

| SIGNAL | SONY XC8500CE CAMERA |
| --- | --- |
| HD | 15.625 KHz ± 1% (64 $\mu$s ± 1%) |
| VD | 25 Hz (625 H, 1H = 64 $\mu$s) |
| TRIG | 25 Hz |
| Shutter Exposure Time | 96 $\mu$s - 20 ms |
| Shutter Speed | 1/10,000 to 1/50 sec. |

Figure 10:
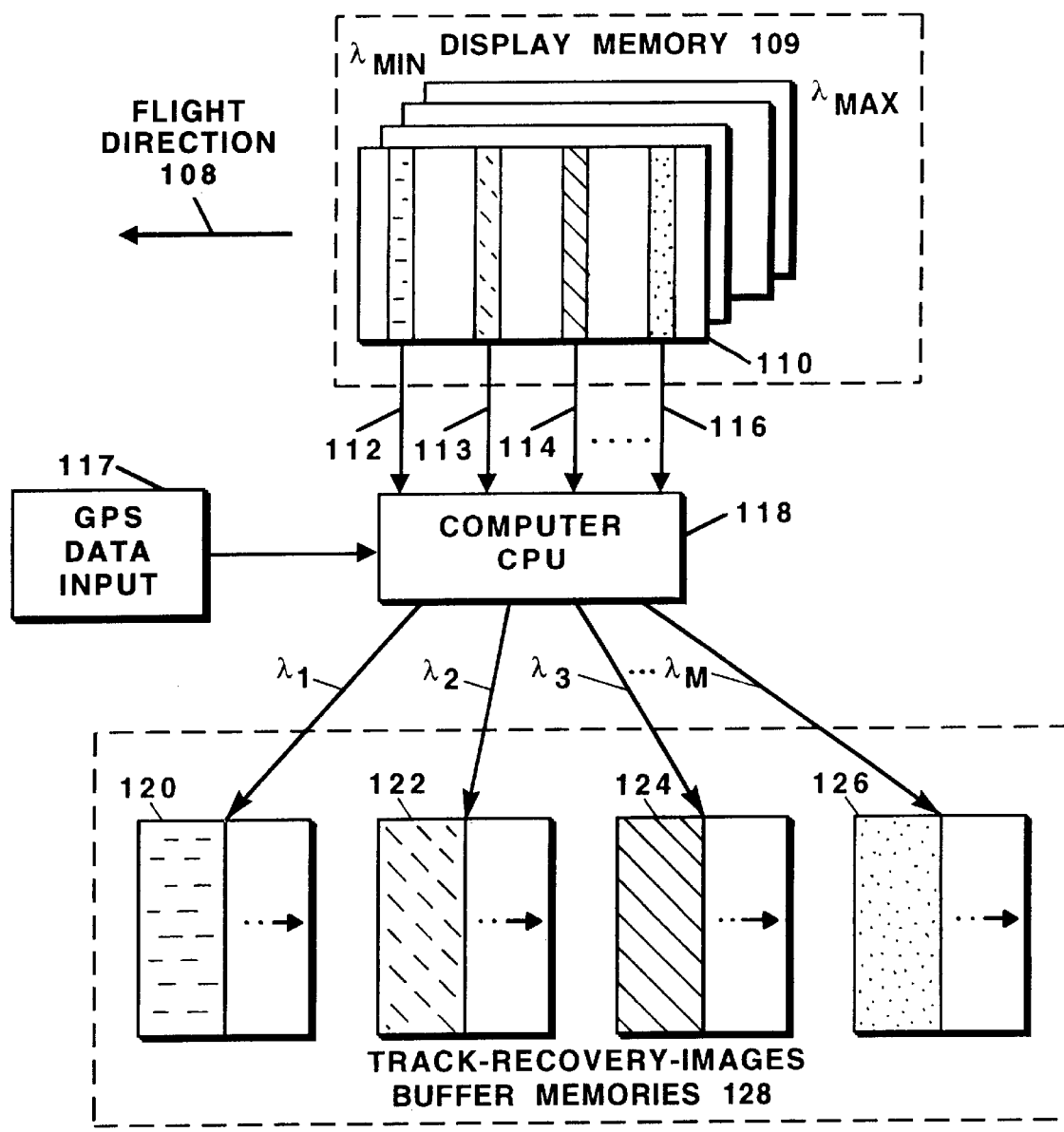
FIG. 10 is a flow chart of the shutter exposure control software program for the invention of FIG. 4.

Referring now to FIG. 10, a flow chart of the shutter exposure control software for the program 220 is shown for the C$_2$VIFIS system 150. First in step 222, the program 220 initializes the imager shutter exposure controller 163 by setting up a working environment required by the imager shutter exposure controller 163, which is integrated in the digital interface 162. After such initialization, an on-board drive outputs the HD and VD signals to TTL level. Hence, the imagers 152, 153, 154 are locked to the HD and VD signals as generated. Next, the software 220 in step 226 obtains an input exposure time from either a preset or a computer determined exposure time, according to the signal level of the digital video, and converts it into a precise phase difference between the trigger signal and the VD signal as shown in FIG. 9. The trigger starts a trigger pulse which switches the electronic drain for every photosite on a CCD. When the drain is on, the photo-electrons are drained and cannot be accumulated. Such an electronic shutter on a CCD is equivalent to an optical shutter in a lens.

The spectrally-filtered imaging system 150 provides the following two classes of spectral image data: first, the spectrally filtered airborne staring/scanning data set (the raw data) and second, processed spectral track-recovery-images produced from the originally recorded staring/scanning (i.e., variable interference) data.

Figure 11:
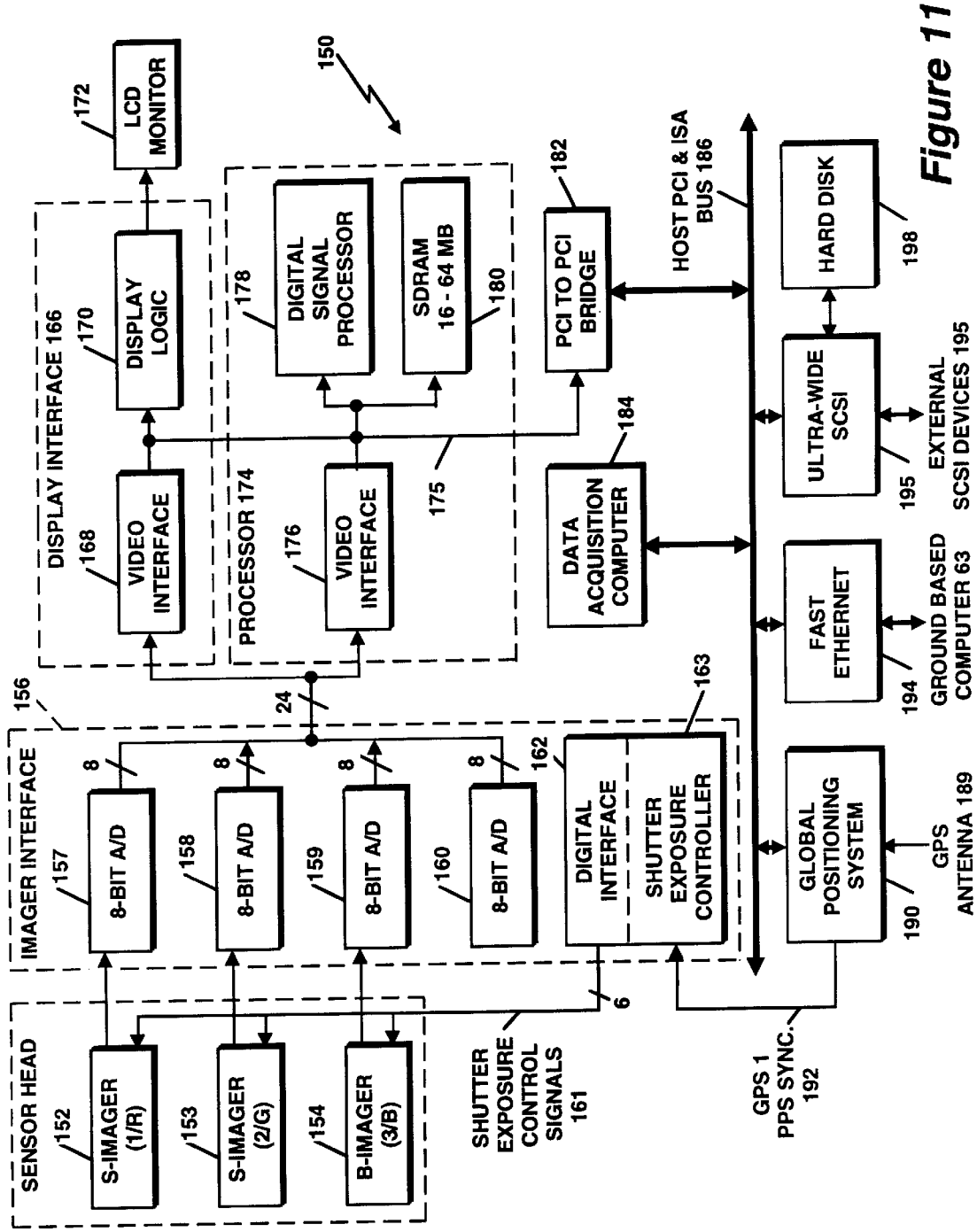
FIG. 11 is a block diagram of a post-processing system for the image data obtained by the system of FIG. 4.

Referring now to FIG. 11, a block diagram of a post-processing system 81 for the C$_2$VIFIS system 150 is shown. The post-processing system 81 is used to review the C$_2$VIFIS staring image sequence and reconstruct spectral track-recovery-image data images from two sources of raw data, staring/scanning data and GPS data. Software 83 stored in the ground based computer 63 performs the post-processing on the digital staring/scanning data using C/C++ language. The software 83 comprises the following program modules:

(a) a load sequence for the staring/scanning data and GPS data 85;

(b) a multi-band track-recovery-image mosaic algorithm 87 reconstructs the data from any or all spectral region of interest to get multiple bands of monochrome images;

(c) a multi-band track-recovering-image co-registration algorithm 88 performs band shift operations in order to get multiple bands geometrically co-registered;

(d) a radiometric calibration algorithm 89 for converting gray-level digital numbers (0–255) to spectral radiance (millimeters per square meter per unit wavelength).

Figure 12:
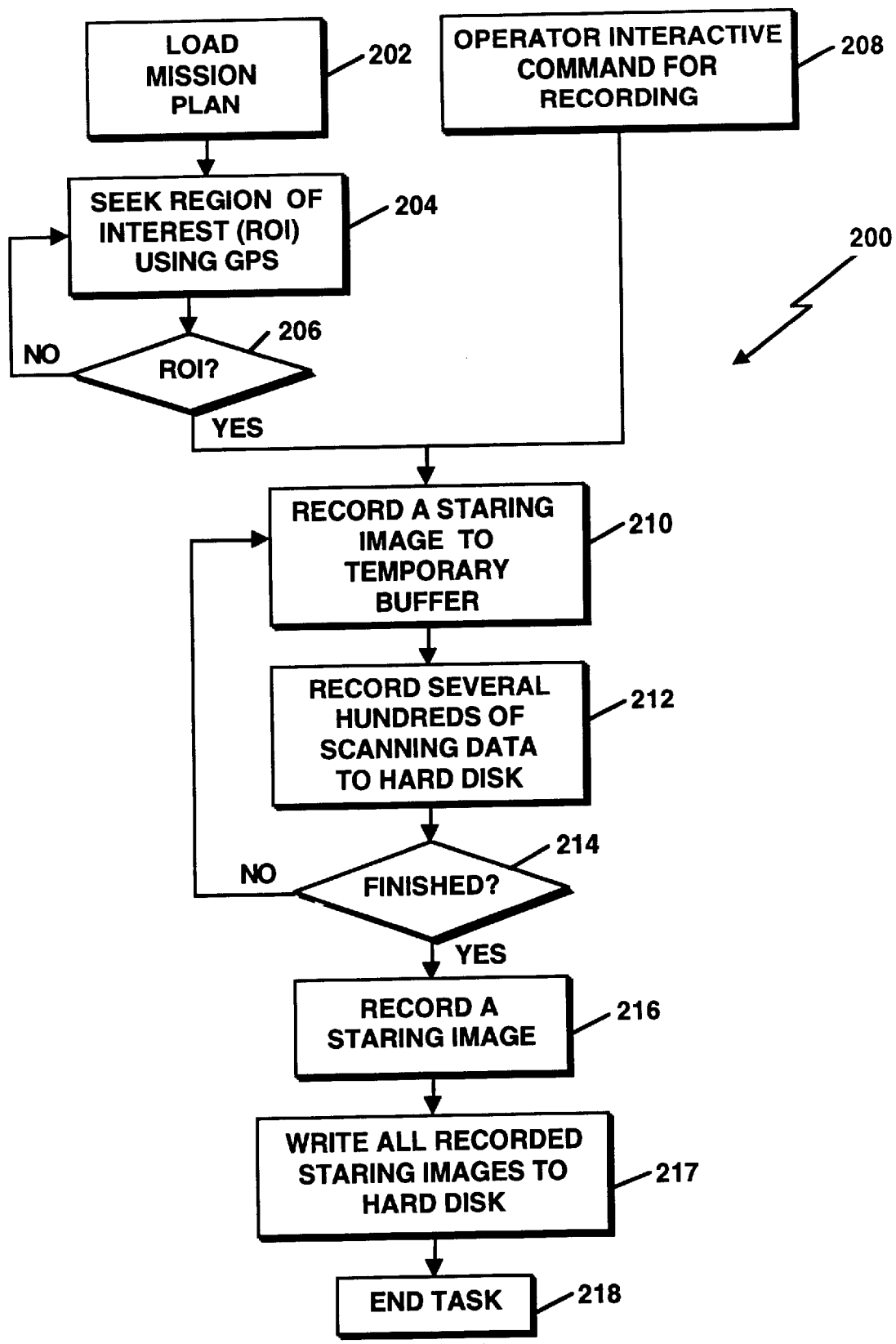
FIG. 12 is a flow chart of a multi-band track-recovery-image mosaic algorithm software program.

Referring now to FIG. 12, a flow chart is shown of the multi-band track-recovery-image mosaic algorithm 87 software program identified in FIG. 11 which recovers the data from the spectral region of interest to get multiple bands of monochrome images. A program initialization 92 creates an application under a Window's operating environment which includes creating application windows, setting up user interfacing, and defining variables. After initialization the program proceeds to geo-reference retrieving 94 which retrieves stored data in accordance with longitude, latitude and altitude information contained in a GPS receiver plus the geometric information supplied by the two-dimensional photographic type of VIFIS imagery. Next, the program proceeds to parameter determination 96 where the following parameters are interactively determined by human-machine negotiation: (1) ground speed (pixel/frame time), (2) segment width of mosaic element, (3) frame-retrieving interval, and (4) pitch, row and yaw parameters. The pitch, row and yaw situation can be examined visually Next, the program proceeds to make memory allocations 98 comprising raw data buffers and track-recovery-image buffers. The program then proceeds to perform data extraction 100 where multiple bands of data are extracted from regions of interest of the original VIFIS frames to the memory buffers. Next, mosaic using geo-references 102 is performed by generating multi-spectral track-recovery-images using either GPS information or a pattern matching algorithm.

Figure 13:
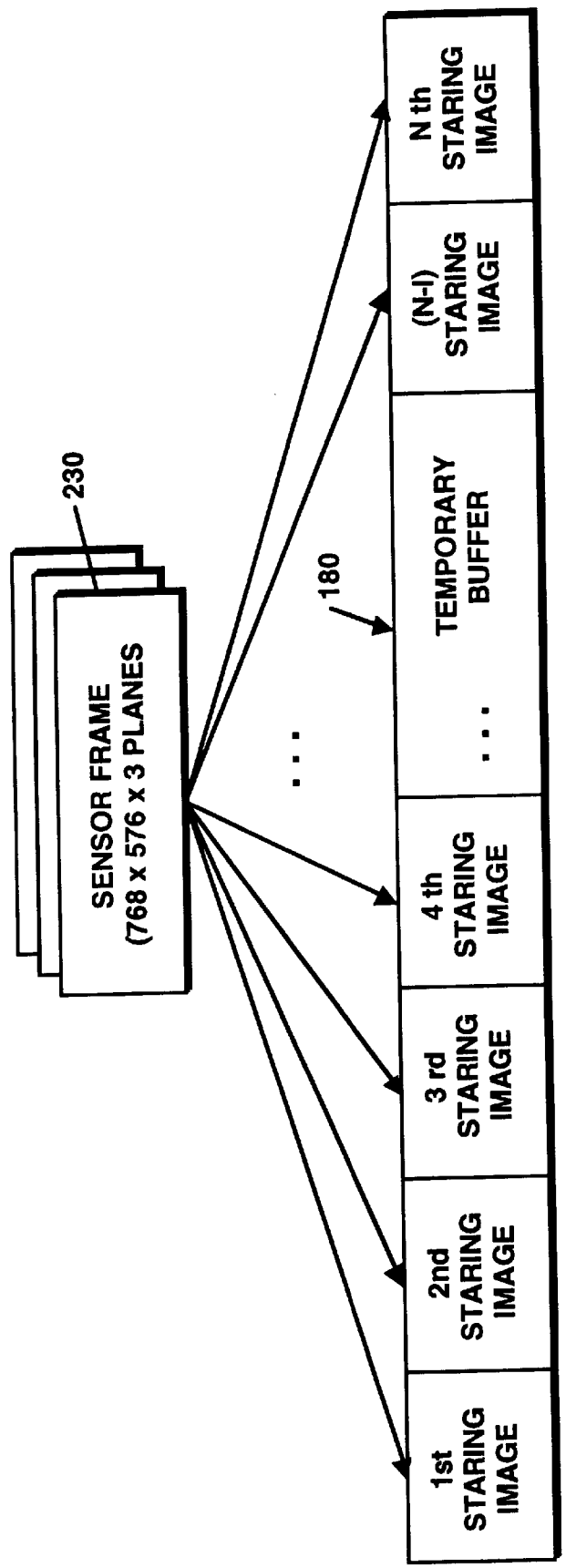
FIG. 13 is a pictorial representation of the operation of the multi-band track-recovery-image mosaic algorithm software program.

Referring now to FIG. 13, a pictorial representation of several bands 112, 113, 114, 116 of the track-recovery-images being produced from a sequence of the raw spectral image data in the range $\lambda$min–$\lambda$max that the C$_2$VIFIS system 10 collects during a flight pass over a target area. During the post-processing, the recorded video sequence, from computer hard disk 198, replays on a desktop computer/monitor 118. When the replayed video sequence is refreshed in a display memory buffer 110 selected data in the marked columns 112, 113, 114, 116 in FIG. 7 are copied and appended to the several track-recovery-images buffer memories 128. This algorithm is now implemented using a computer CPU 118 when data play back occurs from the computer disk.

Referring again to FIG. 13, several bands 112, 113, 114, . . . , 116 of the track-recovery-images can be produced from a sequence of the raw panchromatic (monochromic) images from the image plane 32 of FIG. 1. Because these bands of the track-recovery-images result from the same wavelength range of the reflected solar illumination (assuming the illumination condition remains the same during the aircraft's flying over), the variation among these bands is produced by the viewing angle changes. Therefore, these bands of track-recovery-images are called directional spectral images. These directional spectral images can be used to remove the viewing angle effects (slant errors) associated with the wavelength spectral images (from planes 30 and 34).

It has been theoretically resolved that there are three and only three possible ways to acquire three-dimensional, linear hyperspectral image cube data using a two dimensional image sensor as described in the following two papers: X. Sun and J. M. Anderson, (1992), "A Light-Frequency-Spatially-Selecting Component Based Airborne Pushbroom Imaging Spectrometer for the Water Environment," Proceedings of the First Thematic Conference on Remote Sensing for Marine and Coastal Environments, New Orleans, La. USA, SPIE Vol. 1930, pp 1063–1076, and X. Sun and J. M. Anderson, (1992), "The Sampling Principles of Imaging Spectrometry," Remote Sensing from Research to Operation/Proceedings of the 18th Annual Conference of the Remote Sensing Society, Dundee, Scotland, pp 440–449, Sep. 15–17, 1992. In addition to the spectrally filtered imaging system the other two ways use dispersion and bandpass switching technologies respectively. Although, they are all capable of hyperspectral image data acquisition, each of them has its own intrinsic features. In addition to its structure advantages of simplicity, miniaturization, flexibility in multiple sensor integration and ease of deployment, the present invention of a spectrally filtered video system 10 produces directly understandable, nice and comfortable motion video in real time.

Referring again to FIG. 4, the imager interface 156 comprising four 8-bit analog to digital converters may be embodied by the acquisition portion of an electronic card, Model GEN/F64/8/STD, manufactured by Matrox Electronic Systems, Ltd., of Dorval, Quebec, Canada. The acquisition interface portion acquires data from multiple channels of video devices such as imagers 152, 153, 154 with a programmable configuration at up to a 140 MHz sampling rate. It is also programmed to sense the GPS 1 PPS signal, synchronizing three imagers 152, 153, 154 and to generate the shutter exposure control signals 161. The display interface 166 comprising the video interface ASIC 168 and display logic 170 are embodied by a video interface ASIC (VIA) card with an MGA display chip set both manufactured by Matrox Electronic Systems, Ltd. of Dorval, Quebec, Canada. With this video display hardware a 24-bit, color, three-channel video image is produced with a resolution up to 1600×1200 at 85 Hz with a non-destructive pseudo-color overlay. The processor 174 includes the video interface ASIC 176, the digital signal processor 178 and the SDRAM (16–64MB) 180. The data acquisition computer 184 may be embodied by an Intel Pentium II type computer with a 266 MHz CPU. The global positioning system may be embodied by a Model VP ONCORE 8-channel GPS receiver manufactured by Motorola of Northbrook, Ill. The VP ONCORE is a general purpose receiver with the features of simultaneous 8-satellite tracking, a highly accurate one-pulse-per-second (1 PPS) signal, differential correction, and raw GPS measurement data capabilities for use in the precision positioning and timing. Using the VP ONCORE'S 1 PPS signal improves the accuracy of location measurement of the image acquired.

The fast ethernet 194 card may be embodied by a Model Fast EtherLink 3C905B-TX Network Interface Card (NIC) manufactured by 3Com of Santa Clara, Calif. The remote sensing data acquired by system 150 can be transferred to a ground based computer 63 easily and quickly using this interface card. This approach can reduce turn around time for data acquisition missions and also improves system management, configuration and planning.

The ultra-wide SCSI 195 may be embodied by Model AHA-2940 manufactured by Adaptec of Milpitas, Calif. The hard disk may be embodied by Model Barracuda 9LP (ST39173W) manufactured by Seagate of Singapore with a formatted capacity of 9.1 gigabytes. The SCSI 195 card also permits connection to external SCSI devices such as a CD-ROM drive and a removable hard disk for easy data transfer and system management.

A model of the Data Acquisition Computer 184 was packaged into a compact computer chassis which is one-half the size of a standard desktop PC and tested comprising the Pentium II 266 MHz CPU with a 128 MByte SDRAM, the Matrox image processor card 174 with 64 MB SDRAM 180, the GPS receiver 190, a 9.1 GByte Seagate Barracuda 9LP hard disk 198, a fast Ethernet 194 card and a SCSI 195 card. The data acquisition computer system package weighs less than 20 pounds and has a power dissipation of less than 150 Watts running under Windows NT. The computer system powers and synchronizes the three imagers 152, 153, 154, of the 2S-B sensor head 151 and digitizes the three-channel video data stream simultaneously.

The $C_2$VIFIS system 150 was flight tested in Lubbock, Tex. by NASA and will be tested on a Thrust Vectored Freewing Unmanned Aerial Vehicle by NASA. The hyperspectral measurements provide the user with spectral signatures which are a direct product of molecular differences of the substances being observed. Thus, subtle variations of the returned radiance is correlated directly to different materials or different states of the same material. Using this remote sensing measurement capability of the $C_2$VIFIS system 150 makes it possible to monitor both the land and water bodies to determine the state of health and small changes taking place.

The system 150 is applicable for agriculture and forest management. Site specific or precision farming is making headway by increasing productions and reducing cost through the judicious applications of nutrients and pesticides. Crops are being monitored to determine pest infestation and viruses. Forests are being monitored to determine the health state and maturity of trees. Wetlands are being mapped and monitored, mineral outcrops can be identified, and mere pollution can be detected and traced to its source.

This concludes the description of the preferred embodiment. However, many modifications and alterations will be obvious to one of ordinary skill in the art without departing from the spirit and scope of the inventive concept. Therefore, it is intended that the scope of this invention be limited by the appended claims.

What is claimed is:

1. An imaging spectrometer system comprising:
   a first imager means having a variable interference filter for acquiring spectral images over a first predetermined range;
   a second imager means having a variable interference filter for acquiring spectral images over a second predetermined range;
   a third imager means for acquiring photogrammetric reference and directional spectral images;
   means for synchronizing said first imager means, said second imager means and said third imager means to acquire said images simultaneously;
   means coupled to outputs of said first imager means, said second imager means and said third imager means for converting said outputs from analog to digital signals; and
   means coupled to said outputs of said analog to digital converting means for processing said digital signals of said images, said processing means comprises means for performing an alternating staring and scanning operation.

2. The imaging spectrometer system as recited in claim 1 wherein said system comprises means coupled to said first imager means, said second imager means and said third imager means for controlling a shutter exposure time for acquiring said images.

3. The imaging spectrometer system as recited in claim 1 wherein said processing means comprises memory means for temporary recording staring image data and scanning image data.

4. The imaging spectrometer system as recited in claim 3 wherein said means for temporary recording said staring image data and said scanning image data comprises a synchronized dynamic random access memory (SDRAM).

5. The imaging spectrometer system as recited in claim 4 wherein said system comprises bus means for coupling said disk means to said temporary recording means.

6. The imaging spectrometer system as recited in claim 3 wherein said system comprises disk means coupled to said temporary recording means for recording said staring image data and said scanning image data received from said processing means.

7. The imaging spectrometer system as recited in claim 1 wherein said third image means comprises means for obtaining a set of said staring and scanning operation image data filtered with the same wavelength.

8. The imaging spectrometer system as recited in claim 1 wherein said means for performing said alternating staring and scanning operation comprises means for acquiring an optimized pushbroom hyperspectral image data set with a photogrammetric reference.

9. The imaging spectrometer system as recited in claim 1 wherein each of said first imager means, said second imager means and said third imager means comprises a progressive-scan CCD camera.

10. The imaging spectrometer system as recited in claim 1 wherein said first imager means, said second imager means and said third imager means are aligned to a common field of view.

11. A method of providing an imaging spectrometer system comprising the steps of:

acquiring spectral images over a first predetermined range with a first imager means having a variable interference filter;

acquiring spectral images over a second predetermined range with a second imager means having a variable interference filter;

acquiring directional spectral images with a third imager means;

synchronizing said first imager means, said second imager means and said third imager means to acquire said images simultaneously;

converting outputs of said first imager means, said second imager means and said third imager means from analog to digital signals; and performing an alternating staring and scanning operation on said acquired images digital outputs from said analog to digital converting means in a processing means.

12. The method as recited in claim 11 wherein said method comprises the step of controlling a shutter exposure time of said first imager means, said second imager means and said third imager means for acquiring said images.

13. The method as recited in claim 11 wherein said step of performing an alternating staring and scanning operation comprises the step of temporary recording staring image data while acquiring scanning image data.

14. The method as recited in claim 11 wherein said step of performing an alternating staring and scanning operation on said acquired images comprising the steps of:

(a) recording a staring image in a temporary buffer;

(b) recording a plurality of scanning image data;

(c) performing a comb-styled extraction on said scanning image data;

(d) recording said extracted scanning image data;

(e) repeating said steps a–d a predetermined number of times; and (f) transferring said staring image data from said temporary buffer to a permanent recording means.

15. The method as recited in claim 14 wherein said step of recording a plurality of scanning image data comprises several hundreds of said scanning lines.

16. The method as recited in claim 11 wherein said step of synchronizing said first imager, said second imager and said third imager to acquire said images simultaneously further comprises the step of aligning said imagers to a common field of view.

17. The method as recited in claim 11 wherein said step of performing an alternating staring and scanning operation on said acquired images produces an optimized pushbroom hpyerspectral image data set with a photogrammetric reference.

18. The method as recited in claim 11 wherein said method comprises the step of displaying image data from said first imager means said second imager means and said third imager means on a monitor.

\* \* \* \* \*